March 6, 1951  E. L. WIEDMAN  2,543,948
SPRING CASTER

Filed Jan. 16, 1946  3 Sheets-Sheet 1

Edward L. Wiedman, Inventor
By Emil Kinhart
Attorney.

March 6, 1951 E. L. WIEDMAN 2,543,948
SPRING CASTER
Filed Jan. 16, 1946 3 Sheets-Sheet 2

Edward L. Wiedman
Inventor
By Emil Kuehart
Attorney

March 6, 1951  E. L. WIEDMAN  2,543,948
SPRING CASTER
Filed Jan. 16, 1946  3 Sheets-Sheet 3
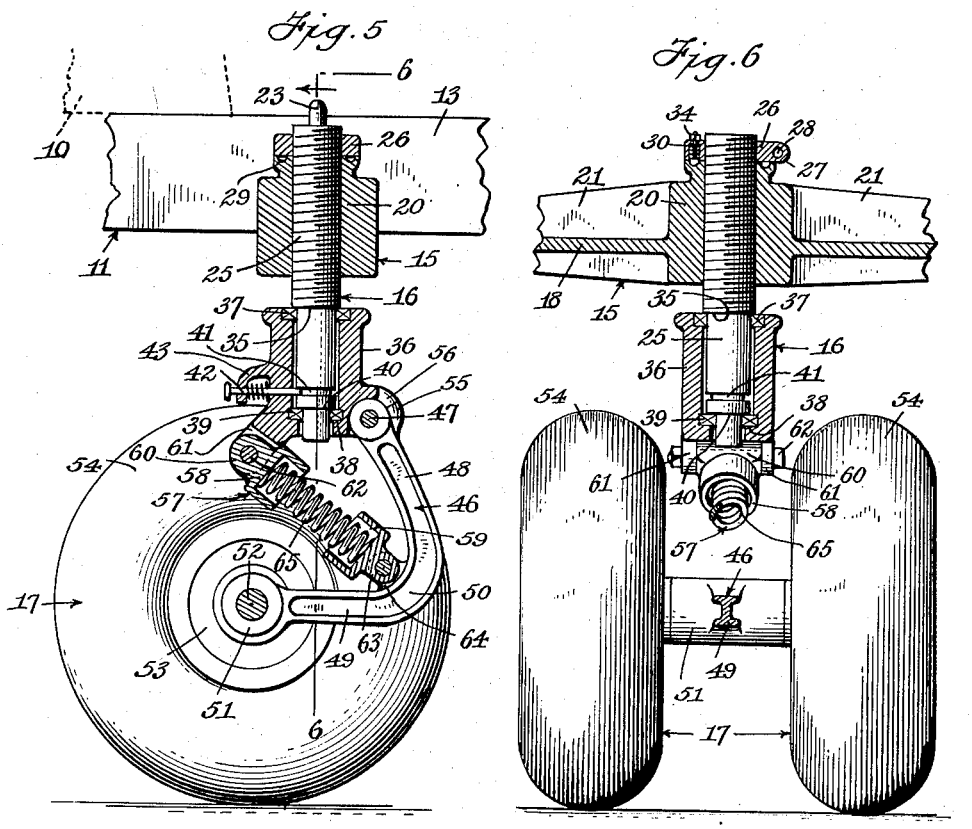
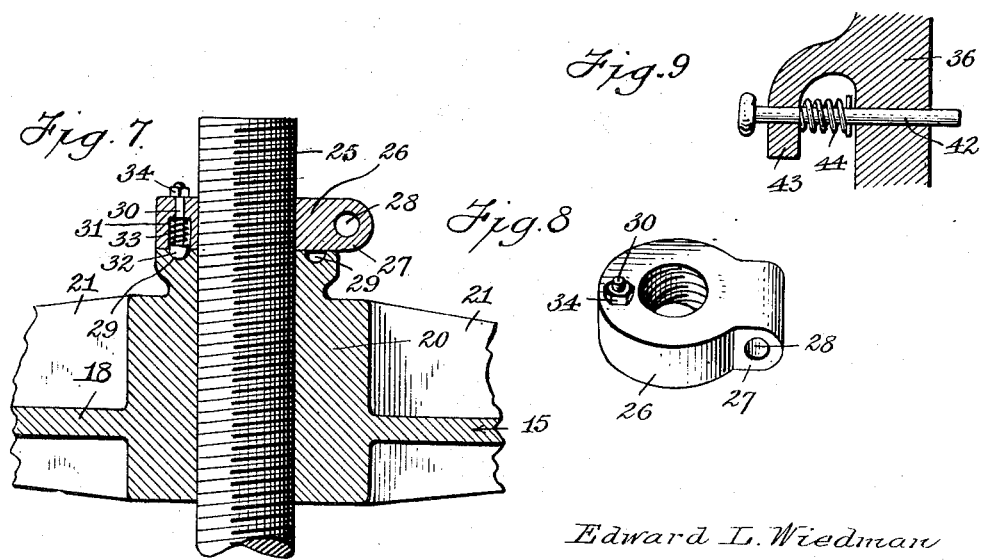
Edward L. Wiedman
Inventor
By Emil Neuhard
Attorney Patented Mar. 6, 1951

2,543,948

UNITED STATES PATENT OFFICE 2,543,948

SPRING CASTER

Edward L. Wiedman, Tonawanda, N. Y.

Application January 16, 1946, Serial No. 641,483

2 Claims. (Cl. 16—44)

My invention relates to a spring caster, commercially referred to as a "dolly."

Devices for such purpose are now in use, but they tend to subject the automobile, to which the trailer is attached, to extreme strains when starting the same and when encountering an obstruction, or abrupt elevations on the road surface when traveling at normal speed; thus making it difficult to start the trailer on its way and tending to force the rear end of the pulling automobile downwardly to increase the resistance against forward movement when starting the trailer under movement.

It is one of the objects of my invention to overcome the tendency and objections just mentioned.

Another object of my invention is to provide a so called "dolly" which is inexpensive, simple in construction and one which can be easily attached to or detached from the trailer and which embodies in its construction what is generally referred to as "knee-action" features so that in starting or when encountering obstructions or abrupt elevated portions on the road, the load applied to the pulling automobile will be eased and consequently less power required to start the trailer and to pull the same along its course.

A further object of my invention is to provide a device of the kind mentioned, which will enable the elevation of the front end of the trailer to be adjusted so as to take off the load from the pulling automobile and which will also enable the trailer to be easily reversed and parked in comparatively narrow spaces.

With these ends in view, my invention consists in the novel feature of construction and in the arrangement and combination of parts to be hereinafter described and more particularly pointed out in the subjoined claims.

In the accompanying drawings,

Fig. 5 is an enlarged section taken on line 5—5, Fig. 3, the combined supporting and adjusting screw and the knee or angular lever being shown in elevation.

Fig. 6 is a section taken on line 6—6, Fig. 5, the traction wheels being shown in elevation.

Fig. 7 is an enlarged detail view of the means provided for adjusting the traction wheels.

Fig. 8 is a detached perspective view of the adjusting nut.

Fig. 9 is a detail view of the retainer device.

Figure 1:
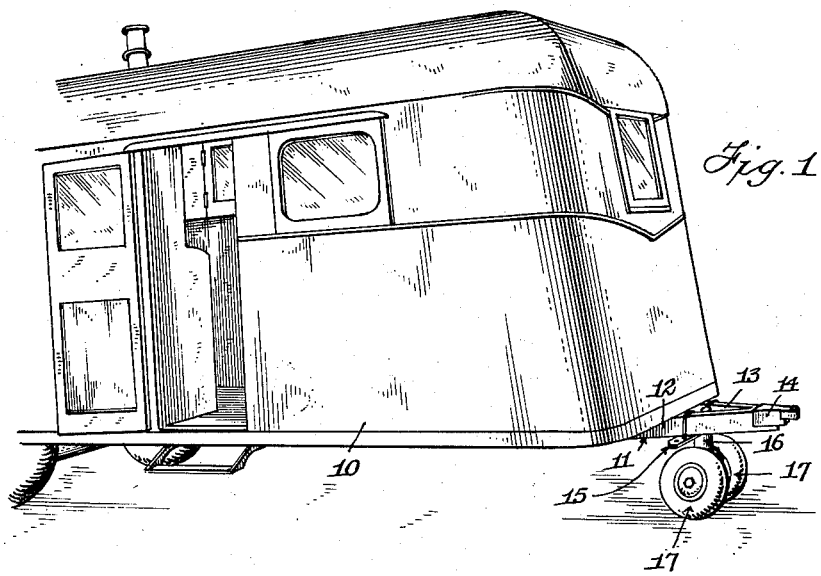
Fig. 1 is a perspective view of a portion of a trailer having my improved device shown attached to the front projecting end of the chassis thereof.
Figure 2:
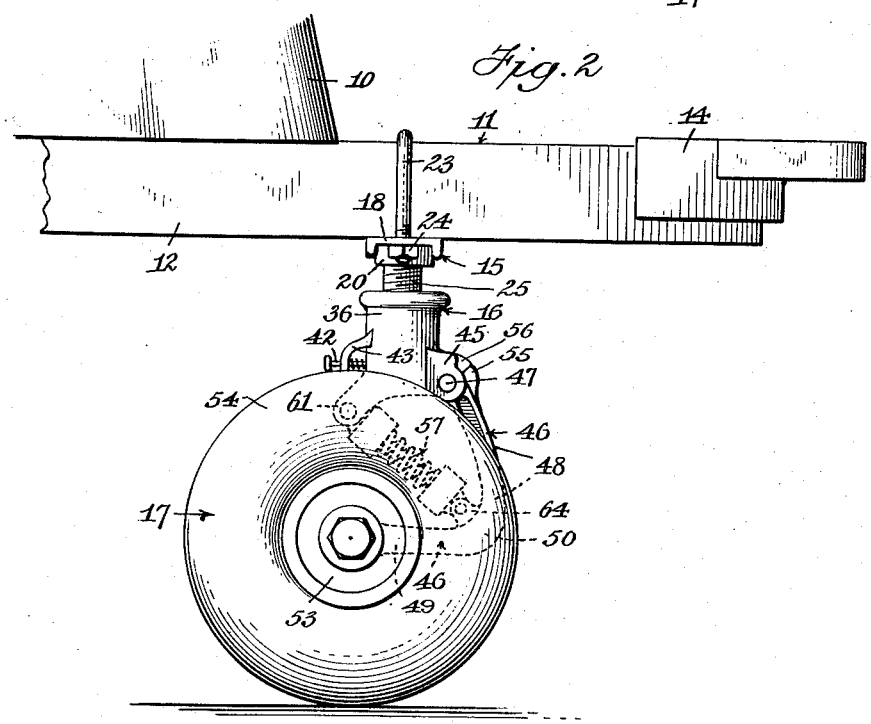
Fig. 2 is a side elevation of the device shown as applied to the front end of a trailer.
Figure 3:
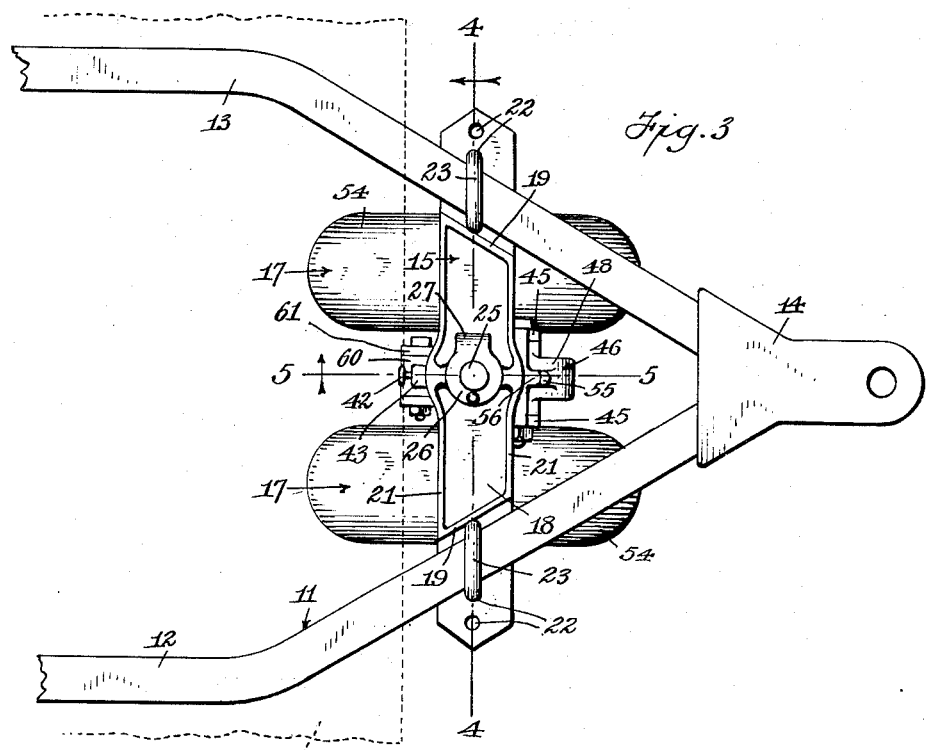
Fig. 3 is a top plan of the front end of the chassis of the trailer, showing my improved device attached thereto.
Figure 4:
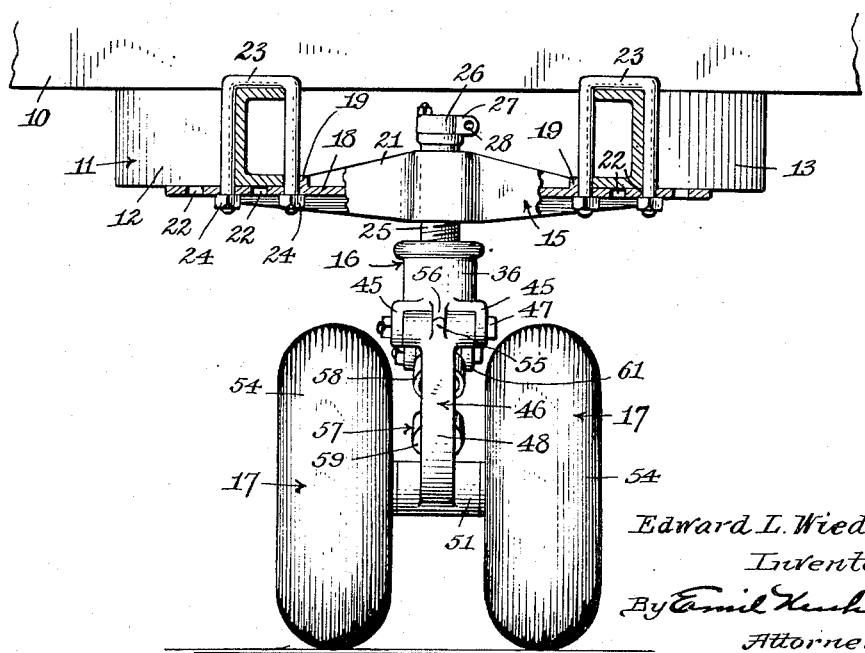
Fig. 4 is a sectional elevation taken on or about line 4—4, Fig. 3, part of the bridge or chassis-attaching member and the traction wheels of the device being shown in elevation.

Having reference to the drawings in detail, 10 designates the trailer, the body of which is supported on any suitable chassis, such as 11. Chassis in common use for trailers includes longitudinal members 12, 13, which are parallel along the greater portion of the length of the trailer body, but have their front ends converging, as shown in Fig. 3, and invariably have a connector, such as 14 or otherwise, applied to their front extremities, by means of which the trailer may be attached to any vehicle designed to pull the same, herein referred to as a pulling automobile.

Directly in front of the front end of the trailer body, I fasten to the two chassis members 12 and 13 of the trailer chassis what I term a bridge or chassis-attaching member 15. This member is preferably applied to the underside of the chassis members and projects at opposite ends beyond the outer sides thereof and at a point centrally between said chassis members the upper portion of a vertically-disposed wheel-carrying member 16 is passed therethrough, said member considered as a whole having a pair of spaced-apart traction wheels 17 rotatably mounted thereon.

The bridge or chassis-attaching member 15 is transversely disposed and comprises a flat portion 18, which has near its outer ends diagonal upstanding webs 19 and centrally between its ends a hub portion 20 connected to the diagonally-disposed webs 19 by marginal webs 21, serving to strengthen the flat portion 18 so as to provide the necessary strength while minimizing the weight of the bridge or chassis-attaching member. The diagonal webs 19 are disposed at the angle to which the converging front ends of the chassis members are invariably disposed and in the flat portions outside of said diagonally-disposed webs a series of bolt holes 22 are provided, through two of which, at each end of the bridge member, the threaded free ends of the legs of U-bolts 23 are passed. Said U-bolts straddle the chassis members and have nuts 24 applied to the lower projecting ends of said legs so as to bear against the underside of the bridge-member and thus fasten the latter securely against the undersides of the chassis members. The bolt holes are used in pairs and thus the bridge-member can be adjusted along the chassis of the trailer, which are made of different widths depending on the width of the trailer. It may thus be said that at each end of the bridge-member a series of bolt holes is arranged and these are to be used in pairs to receive the depending legs of U-bolts for fastening the bridge-member to the chassis, regardless of the space intervening between the chassis members at the point where the bridge-member may be considered best suitable for its purpose, the bolt holes in said bridge-member being selectively employed in pairs according to the spacing of the chassis members.

The hub 20 of the bridge-member is internally screw-threaded and receives a threaded supporting-rod 25 which extends upwardly above the hub and has an adjusting nut 26 threaded thereon. This nut may be rotated on the threaded rod by means of a suitable tool, but I have provided it with a lateral extension 27, through which an opening 28 is formed for the reception of a rod, useable as a tool for rotating the nut and providing the desired leverage to raise the front end of the trailer when found desirable or necessary, or otherwise expressed, to lower the traction wheels 17 with relation to the chassis of the trailer. The upper end face of the hub 20 is provided with a circular series of sockets 29 and the adjusting nut 26 has a lock-pin 30 which is designed to be spring-pressed into any one of the series of sockets. For this purpose the adjusting nut is provided with a downwardly-shouldered bore 31, through which the lock-pin is passed, the latter having an enlarged rounded head 32 at its lower end, between which and the shoulder of the bore a spiral spring 33 is arranged to surround the lock-pin, serving to hold the latter in any desired socket of the series of sockets formed in the hub. The upper end of the shank of the lock-pin projects above the upper surface of the adjusting nut and has a nut 34 threaded thereon for adjusting the lock-pin so that it will enter the sockets to a distance that will permit its being forced upwardly out of its receiving socket upon turning the adjusting nut on the threaded supporting-rod 25, yet provide assurance against accidental turning of the adjusting nut when the lock-pin is entered in any one of the sockets of the series provided.

The lower portion of the supporting rod 25 is reduced in diameter to form a downwardly-facing shoulder 35 and this reduced portion is entered in a tubular supporting head 36, which is bored out longitudinally to receive the rod. The bore of the supporting head is of somewhat greater diameter than the reduced portion of said rod, just mentioned. The bore of the supporting head is recessed or enlarged at its upper end to receive an anti-friction bearing 37 which, as commonly used, includes an outer and an inner member. The outer member being entered in the recess or enlargement of the bore, while the inner member is applied to the supporting rod and bears against the downwardly facing shoulder 35 of the same.

At the lower end of the supporting head 36, the bore formed therein is reduced in diameter to form an upwardly-facing shoulder 38 against which the outer member of an anti-friction bearing 39 rests, and that portion of the supporting rod 25 which extends through said last mentioned anti-friction bearing member and the reduced portion of the bore, is accordingly reduced in diameter to form a downwardly-facing shoulder 40 against which the inner member of said anti-friction bearing 39 bears. The reduced lower end of the supporting rod may terminate within the reduced portion of the bore, or project beyond the same as shown in the drawings. It will be apparent, therefore, that at the upper end of the supporting head, an anti-friction bearing is provided to minimize friction created under radial pressures and that at the lower end of said head, the anti-friction bearing serves to minimize friction created under thrust.

It will also be apparent that contact of the supporting rod 25 is had within the head 36 only at the regions where these anti-friction bearings are provided and that the wall of the bore is otherwise spaced from the peripheral surface of the rod, thus eliminating considerable machine work. No attempt has been made to illustrate the anti-friction bearings in detail, since these are commercially obtainable in various forms suitable for the purpose.

The rod 25 is provided with a peripheral groove 41 a short distance above the thrust bearing 39, which is adapted to be entered by a retainer pin 42 passed through the wall of the supporting head 36 and through a lug 43 extending laterally from the head and having a portion thereof spaced from the outer surface of the head, the projecting end of the pin being headed to enable the retainer pin to be easily withdrawn from the annular groove formed in the rod 25. To maintain this retainer pin with said groove, a spiral spring 44 surrounds the same between the spaced-apart portion of said lug and a cotter pin passed through the retainer pin.

Projecting forwardly from the lower end of the supporting head 36 is a pair of spaced apart lugs 45 between which one end of a substantially V-shaped lever 46 is fastened by means of a pivot 47. This lever may be referred to as an angular lever having from its substantially medial point an upwardly and rearwardly directed arm 48 and a second arm 49 which extends rearwardly and approximately horizontally from the medial point at which said arms merge or connect. The merging of said arms is preferably accomplished by a rounded portion 50. The rear end of the substantially horizontal arm 49 terminates in a transverse bearing sleeve 51, in which an axle 52 is arranged so as to protect from opposite ends thereof and on each of the projecting portions of this axle, the wheel hubs 53 are mounted, around which pneumatic tires 54 are arranged, the wheel hubs being provided with suitable anti-friction bearings in any approved manner.

Due to the angular lever 46 being pivoted at its upper end to the supporting head 36, this lever is designed to swing rearwardly from its normal position and its forward movement is prevented by a stop lug 55 thereon which is normally in contact with a stop lug 56 formed on the supporting head 36. Said angular arm is retained in normal position with the lugs 55 and 56 in contact with each other by a cushioning device 57 which, in association with the angular lever 46, forms a "knee-action" device. This cushioning device, in the exemplification shown, includes two cup-like members 58 and 59. Member 58 has a lug 60 formed thereon which is connected to a rearwardly-and-downwardly extending pair of lugs 61 formed on the supporting head 36, the connection being effected by means of a pivot pin 62. The cup-like member 59 has a lug 63 thereon connected to a pair of lugs 64 on the angular lever 46 at the bight of the latter. These cup-like members have open ends facing each other and they are spaced apart to receive between them a bumper or cushioning element which may be in the form of a spiral spring 65, one end of which is entered in the cup-like member 58 and the other end in the cup-like member 59. This spring, when properly assembled with the cup-like members 58 and 59, is placed under pressure and exerts its force against the angular lever 56 to hold the supporting and traction wheels 17 against the road surface. The cup-like members 58, 59 therefore serve as hinged abutments for the spring 65.

When the trailer is parked or stored, the front end thereof may be supported with trailer-jacks, so adjusted that the weight of the trailer is removed from the supporting and traction wheels, and if desired, these wheels and their associated parts, when so supported, may be removed from the trailer by withdrawing the retainer pin 42 from the peripheral groove 41 in the supporting rod 25 and then removing the supporting head 36 from said rod. The supporting or traction wheels may be brought in contact with the road surface with the desired pressure by rotating the adjusting nut 26, rotation of said nut in one direction causing said supporting rod to be lowered while rotation in an opposite direction will cause said rod to be elevated; in each instance carrying with it the supporting head 36 and the "knee-action" device consisting on the angular lever 46 with its hub and the spring device 57.

From the foregoing description it will be apparent that when starting a trailer under the pulling action of the automobile to which it is attached, the tendency of the traction wheels is to swing rearwardly, thus releasing the strain and the superimposed weight from said wheels and placing a pulling strain on the trailer in a substantially horizontal direction, thus materially relieving the pulling automobile from considerable strain and assuring a quick start. In the event that the traction wheels come in contact with an obstruction or an abrupt elevated portion of the road surface, the pivoted portion of the wheel-carrying member 16 will swing rearwardly under restraint of the spiral spring 65, which will become compressed in proportion to the resistance offered by the road surface; and in traveling over rough surfaces, the short staccato or vibratory shocks will be absorbed by said spring under short compression and expansion action.

It will be understood from the foregoing that this invention provides a means for utilizing one or more traction wheels of small diameter compared to the diameter of the remaining traction wheels of the trailer, means to attach said traction wheel or wheels in a manner that will permit of raising or lowering them with respect to the body of the trailer so as to adjust the weights of the trailer when attached to a pulling automobile; and that the invention further tends to relieve the pulling automobile from harmful or destructive strains, especially when starting the trailer into motion, or when traveling over rough roads or encountering obstructions of various kinds while traveling, and provides a "knee-action" device between the axle for the traction wheel or wheels and the point of attachment thereof to the trailer chassis.

It will further be apparent that the supporting head 36 has its axis in a plane in front of the axis of the axle 52 and thus the traction wheels may be said to be off-center, and by reason of the supporting head being supported on the supporting rod 25 in the manner described, it is rotatable on said rod and thus permits of easily swinging the front end of the trailer laterally when parking the latter in close quarters. Moreover, the swivel mounting thus provided for the traction wheels enables the trailer to more readily follow the pulling trailer in its course.

Having thus described my invention, what I claim is:

1. A device of the kind described, comprising a supporting head having a rearwardly-and-downwardly directed lug extending from its lower end and a forwardly projecting stop lug in a plane above its lower end, a substantially V-shaped lever disposed to provide an upwardly-and-rearwardly extending arm and a substantially horizontal rearwardly-extending arm, the outer end of said first-mentioned arm being pivotally connected to said supporting head adjacent its stop lug and having also a stop lug thereon adapted to normally engage the stop lug on said supporting head, the free end of said substantially horizontal arm having a hub formed thereon, an axle passed through said hub and projecting from opposite ends thereof, traction wheels mounted on the projecting ends of said axle, and a cushioning device comprising two spaced-apart cup-like members axially alined and disposed in opposition and a cushioning element entered at opposite ends in said cup-like members, one of said cup-like members having pivotal connection with said substantially V-shaped lever at the bight thereof and the other cup-like member having pivotal connection with the rearwardly-and-downwardly projecting lug on said supporting head.

2. A device of the kind described, comprising a supporting head having its axis vertically disposed and provided with a rearwardly-and-downwardly directed pivot lug extended beneath its lower end in rear of its axis and a forwardly projecting stop lug forward of its axis, a substantially V-shaped member disposed to provide an upwardly-and-rearwardly extending arm whose outer end is pivotally secured to said supporting head forward of its axis and a substantially horizontal rearwardly projecting arm, said arms forming a rearwardly-facing bight on said V-shaped member, a stop lug at the pivoted outer end of said upwardly-and-rearwardly extending arm, a second stop lug on said supporting head normally in contact with said first-mentioned stop lug, an axle carried by the outer end of said substantially horizontal rearwardly projecting arm, a traction wheel mounted on said axle, and a cushioning device between the bight of said substantially V-shaped member and said rearwardly-and-downwardly directed pivot lug, said cushioning device including a spiral spring and cup-like members receiving opposite ends of said spring and pivotally connected to said rearwardly-and-downwardly directed pivot lug and to said substantially V-shaped member at the bight thereof.

EDWARD L. WIEDMAN.

REFERENCES CITED

The following references are of record in the file of this patent:

UNITED STATES PATENTS

| Number | Name | Date |
|---|---|---|
| 1,237,507 | Gregory | Aug. 21, 1917 |
| 1,429,187 | Bunker | Sept. 12, 1922 |
| 1,480,588 | Wise et al. | Jan. 15, 1924 |
| 1,777,565 | Hulley | Oct. 7, 1930 |
| 2,033,298 | Pribil | Mar. 10, 1936 |
| 2,087,299 | Pribil | July 20, 1937 |
| 2,139,503 | Jordan | Dec. 6, 1938 |
| 2,174,465 | Jedlicka | Sept. 26, 1939 |
| 2,227,875 | Boden | Jan. 7, 1941 |
| 2,256,038 | Woodruff | Sept. 16, 1941 |
| 2,271,304 | Mulholland | Jan. 27, 1942 |
| 2,350,624 | McDaniel | June 6, 1944 |
| 2,403,338 | Jordan | July 2, 1946 |
| 2,410,570 | Davis | Nov. 5, 1946 |
| 2,447,659 | McDaniel | Aug. 24, 1948 |